(12) United States Patent
Ruggeri

(10) Patent No.: US 12,365,629 B1
(45) Date of Patent: Jul. 22, 2025

(54) CONCRETE MASONRY UNIT COMPOSITION FOR AUTOMATED BLOCK MACHINES

(71) Applicant: John R. Ruggeri, St. Augustine, FL (US)

(72) Inventor: John R. Ruggeri, St. Augustine, FL (US)

( * ) Notice: Subject to any disclaimer, the term of this patent is extended or adjusted under 35 U.S.C. 154(b) by 0 days.

(21) Appl. No.: 18/903,069

(22) Filed: Oct. 1, 2024

(51) Int. Cl.
| | |
|---|---|
| *C04B 28/08* | (2006.01) |
| *C04B 14/06* | (2006.01) |
| *C04B 20/00* | (2006.01) |
| *C04B 28/04* | (2006.01) |
| *E04B 2/02* | (2006.01) |
| *E04B 2/18* | (2006.01) |

(52) U.S. Cl.
CPC .............. *C04B 28/08* (2013.01); *C04B 14/06* (2013.01); *C04B 20/0016* (2013.01); *C04B 28/04* (2013.01); *E04B 2/18* (2013.01); *C04B 2201/50* (2013.01); *E04B 2002/0204* (2013.01)

(58) Field of Classification Search
CPC ..... C04B 28/08; C04B 14/06; C04B 20/0016; C04B 28/04; C04B 2201/50; E04B 2/18; E04B 2002/0204
See application file for complete search history.

(56) References Cited

U.S. PATENT DOCUMENTS

| | | | |
|---|---|---|---|
| 3,257,338 A | 6/1966 | Sefton | |
| 4,306,395 A | 12/1981 | Carpenter | |
| 5,482,550 A | 1/1996 | Strait | |
| 5,737,896 A | 4/1998 | Rodgers | |
| 6,851,235 B2 | 2/2005 | Baldwin | |
| 8,167,998 B2 | 5/2012 | Ladely (Guevara) et al. | |
| 2005/0160944 A1 | 7/2005 | Wagh et al. | |

FOREIGN PATENT DOCUMENTS

| | | | |
|---|---|---|---|
| CN | 111138149 A | * | 5/2020 |
| CN | 116217167 A | * | 6/2023 |
| DE | 19600606 A1 | | 7/1997 |
| PH | 22016000246 U | | 6/2016 |
| WO | 2004087605 A1 | | 10/2004 |

OTHER PUBLICATIONS

Solikin, Styrofoam as partial substitution of fine aggregate in lightweight concrete bricks, Jun. 30, 2018.
Cemteq, Polystyrene concrete blocks in construction, Dec. 31, 2022.

* cited by examiner

*Primary Examiner* — Anthony J Green
(74) *Attorney, Agent, or Firm* — Lippes Mathias LLP; Mitchell Ghaneie; Josephine Chen

(57) ABSTRACT

The present invention provides a concrete masonry unit composition for automated block machines, comprising cement, aggregate, sand and microbeads with respect to total weight of the composition. After a predetermined number of days, the composition forms a plurality of concrete masonry units that meet the requirements under standards ASTM C90 as measured according to ASTM C140. Each of the concrete masonry units comprises a solid portion and at least one hollow portion boring through the solid portion. The solid portion comprises 0.25 to 0.5 percent of microbeads with respect to total weight of the composition.

19 Claims, 2 Drawing Sheets

```
┌─────────────────────────────────────────────────────────┐
│ Combining, by an automated block machine, a             │
│ predetermined amount of cement, a predetermined         │
│ amount of aggregate, a predetermined amount of sand,    │
│ and a predetermined amount of microbeads with a         │
│ predetermined amount of water to form a mixture.        │
└─────────────────────────────────────────────────────────┘
                            ▼
┌─────────────────────────────────────────────────────────┐
│ Molding the mixture by the automated block machine.     │
└─────────────────────────────────────────────────────────┘
                            ▼
┌─────────────────────────────────────────────────────────┐
│ Compacting and vibrating the mixture by the automated   │
│ block machine to form a plurality of CMUs.              │
└─────────────────────────────────────────────────────────┘
                            ▼
┌─────────────────────────────────────────────────────────┐
│ Demolding the plurality of CMUs                         │
└─────────────────────────────────────────────────────────┘
                            ▼
┌─────────────────────────────────────────────────────────┐
│ Curing the plurality of CMUs for at least 7 days        │
└─────────────────────────────────────────────────────────┘
```

FIGURE 2

CONCRETE MASONRY UNIT COMPOSITION FOR AUTOMATED BLOCK MACHINES

FIELD OF THE INVENTION

The subject matter disclosed herein generally relates to concrete composition and more specifically to a composition for concrete masonry units that are utilized in automated block machines.

BACKGROUND

In the construction industry, concrete masonry units (herein after as "CMUs") are widely used for constructing walls and structures in residential and commercial buildings due to their durability, strength and versality. CMUs are typically standardized in measurements and are constructed from materials with higher stiffness to provide load-bearing capacity and resist from deformation. The most commonly used materials include cement and aggregates such as sand and crushed stone.

CMUs have been around for more than a century. Over time, the manufacture of CMUs has evolved from hand casting to utilizing automated block machines. For an automated block machine, the materials are placed within a hopper, then are mixed, molded, vibrated, compacted, and demolded automatically. Nevertheless, unsuitable materials may disrupt the production process, for example, by causing obstructions and requiring constant manual adjustment, which reduces overall efficiency of the CMU manufacturing process. The final CMU products may have defects and may not achieve the required standards for compression strength and durability. As a result, additional labor costs and maintenance fees will increase accordingly. Thus, the materials should be appropriate for use in automated block machines.

Furthermore, while it is understood that a variety of CMUs exist, conventional CMUs are still challenging to handle due to their heavy weight. Heavy CMUs require more time, physical effort, and specialized equipment to move, position, and transport. Individuals handling the transportation may become fatigued in a shorter period of time or must be skilled in operating specialized equipment. Also, mishandling heavy CMUs may increase the risk of injury to personnel. Moreover, heavy CMUs necessitate more robust shelving to provide support for storage and may be less accessible in restricted spaces.

As such, it is desirable to provide a composition for concrete masonry units that are utilized in automated block machines, lighter in weight, and satisfy strength requirements.

SUMMARY OF THE INVENTION

The following is a concise summary of the invention presented herein with the primary aim of providing a preliminary understanding of certain aspects of the invention. It should be noted, however, that this summary is not intended to serve as a comprehensive overview of the invention, nor does it seek to identify or describe any critical or significant elements of the invention or the boundaries of its scope. Its sole purpose is to provide a rudimentary understanding of the invention's concepts and features, which will be expounded upon in greater detail in the ensuing sections.

The present disclosure is generally directed towards a composition for CMUs, which is more specifically directed towards a CMU composition for automated block machines (herein after as "the composition"). The composition design is not only suitable for automated block machines, but also reduces the use of coarse aggregates and fine aggregates such as sand, which decreases total cost and weight for each CMU. Most importantly, after a curing time frame of 14 days, the CMUs meet the requirements under standards ASTM C90 as measured according to ASTM C140, while having a minimum net area compressive strength of at least 1900 psi. In some implements, the CMUs preferably have a minimum net area compressive strength of at least 2000 psi.

A non-limiting exemplary embodiment (the "exemplary embodiment") of the present disclosure provides a CMU composition for automated block machines and is disclosed herein. The composition comprises a predetermined percentage of cement; a predetermined percentage of coarse aggregate; a predetermined percentage of fine aggregate; and a predetermined percentage of microbeads with respect to total weight of the composition. Preferably, the predetermined percentage of cement is 13 to 23 percent; the predetermined percentage of coarse aggregate is 20 to 30 percent; a predetermined percentage of fine aggregate is 60 to 70 percent; and a predetermined percentage of microbeads is 0.25 to 0.5 percent.

In some implements, the predetermined percentage of cement is 13 to 16 percent; the predetermined percentage of coarse aggregate is 24 to 25 percent; a predetermined percentage of fine aggregate is 59 to 64 percent; and a predetermined percentage of microbeads is 0.3 to 0.4 percent.

In another aspect, with respect to total volume of the composition, the composition comprises 10 to 14 volume percent cement, 23 to 25 volume percent coarse aggregate, 58 to 60 volume percent fine aggregate, and 3 to 4 volume percent microbeads.

After the composition is fed to an automated machine, mixed, molded, vibrated, compacted, demolded and cured for 14 days, each of the CMUs meet the requirements under standards ASTM C90 as measured according to ASTM C140.

In one non-limiting implement, each of the CMUs comprise a solid portion, and at least one hollow portion boring through the solid portion. The solid portion comprises cement, aggregate, sand, and a predetermined percentage of microbeads with respect to total volume of the solid portion of the CMU. In some instances, the predetermined percentage of microbeads is 10 to 25 percent with respect to total volume of the solid portion.

Advantageously, the CMU formed by the composition is lighter in weight, easier to handle and transport. Comparing to conventional CMUs, the exemplary embodiment reduces the weight of each CMU by approximately 5 to 7 pounds and shouldn't increase the cost for manufacturing.

The above features and advantages will become apparent from the following detailed description taken with the accompanying drawings.

BRIEF DESCRIPTION OF DRAWINGS

FIG. 2 is a diagram showing a method of manufacturing CMUs in accordance with some embodiments of the present disclosure.

NUMBER REFERENCES

Figure 1:
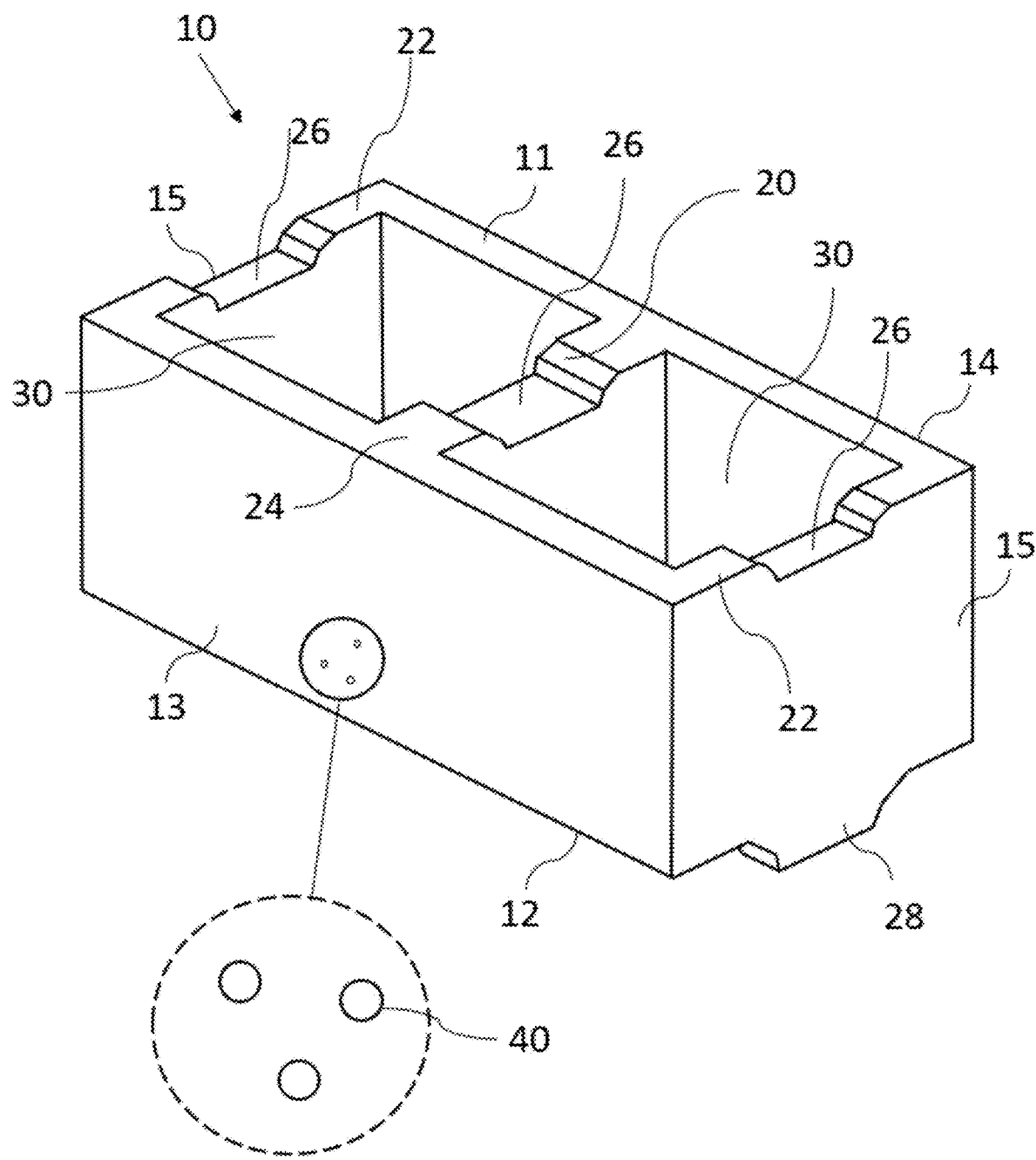
FIG. 1 is a front perspective view of a CMU formed by an exemplary embodiment of a CMU composition for automated block machines in accordance with some embodiments of the present disclosure.

10—Concrete Masonry Unit
11—Top Surface

12—Bottom Surface
13—Front Surface
14—Rear Surface
15—Side Surface
20—Solid Portion
22—Side Wall
24—Intermediate Wall
26—Groove Member
28—Tongue Member
30—Hollow Portion
40—Microbeads

DETAILED DESCRIPTION OF THE INVENTION

The following detailed description and accompanying drawings provide a comprehensive disclosure of exemplary embodiments for the purpose of facilitating one of ordinary skill in the relevant art to make and use the invention. Therefore, the detailed description and illustration of the one or more exemplary embodiments presented herein are purely exemplary in nature and are not intended to limit the scope of the invention or its protection in any manner. It is further noted that the drawings may not be to scale, and in some cases, certain details may be omitted which are not necessary for an understanding of the present invention, such as conventional details of fabrication and assembly.

As described herein, various compositional ranges do not exceed a hundred percent in total and unless indicated otherwise, the numerals of various compositional ranges presented herein are approximations.

As used in the following detailed description, the term "concrete masonry unit (CMU)" and variants thereof may refer to any standard size rectangular block used in building construction. The CMUs may vary in dimension, size, structure, and shape, including but not limited to normal weight CMU, medium weight CMU, lightweight CMU, solid CMU, hollow CMU, and CMU with flanges.

As used in the following detailed description, the term "cement" and variants thereof may refer to a cementitious material used as a conglomerate that hardens after being in contact with water.

As used in the following detailed description, the term "microbeads" and variants thereof may refer to microsphere particles that are millimeters in size. They are lightweight but occupy more volume. Non-limiting examples of microbeads may include Styrofoam microbeads, expanded polystyrene microbeads, expanded polymer particles.

A non-limiting, exemplary embodiment (hereinafter as "the exemplary embodiment") of a CMU composition for automated block machines (herein after as "the composition") is disclosed herein. The composition comprises a predetermined percentage of cement, a predetermined percentage of coarse aggregate; a predetermined percentage of fine aggregate; and a predetermined percentage of microbeads with respect to total weight of the composition. Preferably, the predetermined percentage of cement is 13 to 23 percent, the predetermined percentage of coarse aggregate is 20 to 30 percent; a predetermined percentage of fine aggregate is 60 to 70 percent; and a predetermined percentage of microbeads is 0.25 to 0.5 percent.

In some implements, the predetermined percentage of cement is 13 to 16 percent, the predetermined percentage of coarse aggregate is 24 to 25 percent; a predetermined percentage of fine aggregate is 59 to 64 percent; and a predetermined percentage of microbeads is 0.3 to 0.4 percent.

In another aspect, with respect to total volume of the composition, the composition comprises 10 to 14 volume percent cement, 23 to 25 volume percent coarse aggregate, 58 to 60 volume percent fine aggregate, and 3 to 4 volume percent microbeads.

As nonlimiting examples, the cement may comprise one or more materials selected from Portland cement Type I, Type IA, Type II, Type IIA, Type III, Type IIIA, Type IV, Type V, modified cement, hydraulic cement, and blast furnace slag cement that are described in ASTM 90.

As nonlimiting examples, the types of aggregate used may vary based on geographic locations, and may comprise but are limited to normal weight aggregates and lightweight aggregates.

Turning to the microbeads, the microbeads preferably have sphere configurations, are millimeter in size, and are preferably constructed of expanded polystyrene (EPS). A diameter of each of the microbeads may vary from 0.145 mm to 3.2 mm. In the exemplary embodiment, each of the microbeads has a diameter of 0.02 mm. Further, each of the microbeads may or may not have an outer layer coating.

After the composition is provided to an automated block machine, mixed, molded, vibrated, compacted, demolded and cured for at least seven (7) days, the composition forms a plurality of CMUs and meet the requirements under standards ASTM C90 as measured according to ASTM C140.

Referring to FIG. 1, a nonlimiting CMU 10 is illustrated in accordance with the exemplary embodiment. The CMU 10 is substantially a rectangular prism having a top surface 11, a bottom surface 12 opposite from the top surface 11, a front surface 13, a rear surface 14 opposite from the front surface 13, and two paralleled side surfaces 15 extending between the front surface 13 and the rear surface 14. The CMU 10 further comprises a solid portion 20 that, along with the bottom surface 12, the front surface 13, and the rear surface 14, defines at least one hollow portion 30 boring from the top surface 11 to the bottom surface 12. As depicted in FIG. 1, the exemplary embodiment has two hollow portions 30 aligned to each other, forming two side walls 22 paralleled and opposite from each other, and an intermediate wall 24 substantially parallelly positioned in between the two side walls 22. Preferably, the two hollow portions 25 have similar configurations, and are each substantially rectangular prisms. Moreover, edges and centers of each of the two hollow portions 30 are in line with each other. The solid portion 20 is around 45 to 55 percent with respect to total volume of the CMU 10. Preferably, physical requirements such as nominal width, face shell thickness, web thickness, and normalized web area conform with ASTM C90.

With the addition of the microbeads 40 in the composition to form the CMUs 10, each of the CMUs 10 formed by the exemplary embodiment composition is lighter in weight and can be considered in a class of standard lightweight CMUs. The microbeads 40 are around 10 to 25 percent with respect to total volume of the solid portion 20, and each of the microbeads 40 preferably has a diameter of 0.02 mm. In some implements, the top surface 11 and the bottom surface 12 of each of the side walls 22 and the intermediate wall 24 comprises alignment components including one or more groove members 26 and one or more tongue members 28 of corresponding configurations. One of the groove members 26 on the top surface 11 of a first one of the CMUs 10 receives a corresponding one of the tongue members 28 disposed on the bottom surface of another CMU 10 which is placed on top of the first CMU 10. It is anticipated that configurations of the hollow portions 30 may vary, depending on the types of the CMUs 10. In some instances, CMUs 10 that are configured as starter blocks have flat bottom surfaces 12 without any tongue members 28, and CMUs 10 that are configured as corners can have different configurations compared to starter block CMUs 10 or standard CMUs 10.

Advantageously, having the CMUs 10 lighter in weight and comprising alignment components such as the groove member(s) 26 and the tongue(s) 28, an "upper" CMU 10 may be correctively aligned to a "lower" CMU 10 effortlessly during wall construction.

The following data including test conditions and test results are demonstrations of CMUs manufactured by a standard composition without addition of microbeads, identified as "Control", and two exemplary embodiments of the composition, identified as "Composition 1" and "Composition 2". After setting for at least 14 days, the exemplary embodiments conform the physical requirements of "Standard Specification for Loadbearing Concrete Masonry Units" (ASTM C90) as measured by "The Standard Test methods for sampling and testing concrete masonry units and related units" (ASTM C140). The exemplary embodiments are merely illustrative and are not intended to be limiting.

The following materials are utilized in the CMUs 10 and are measured by weight percentages.

| Materials | Control | Composition 1 | Composition 2 |
|---|---|---|---|
| Cement | 11% | 13.1% | 15.8% |
| Aggregate | 26% | 25.2% | 24.4% |
| Sand | 63% | 61.4% | 59.4% |
| Microbeads | 0% | 0.3% | 0.4% |

Volume percentages of the materials utilized in the CMUs 10 are shown below.

| Materials | Control | Composition 1 | Composition 2 |
|---|---|---|---|
| Cement | 9.12% | 10.9% | 13.14% |
| Aggregate | 27.19% | 25% | 23.97% |
| Sand | 63.69% | 60.68% | 58.51% |
| Microbeads | 0% | 3.42% | 4.38% |

The composition is fed to an automated block machine, mixed, molded, vibrated, compacted, demolded and cured for at least seven (7) days to form CMUs 10. The CMUs 10 are then tested according to ASTM C140. Each of the compositions are tested using three units, and the two exemplary embodiments of the composition conform with ASTM C90 as tested by ASTM C140. The ASTM 90 standard and the test results are shown below. It is anticipated that the composition, may further comprise one or more of water reducer agents, bonding agents, color agents and water proofing agents.

ASTM C90 Physical Requirements

As stated in ASTM C90, for hollow units, face shell thickness ($t_{fs}$) and web thickness ($t_w$) shall conform to the following requirements prescribed below.

TABLE 1

Minimum Face Shells and Web Requirements

| Nominal Width (W) of Units, in. (mm) | Face Shell Thickness ($t_{fs}$), min, in. (mm) | Webs Web Thickness (tw), min, in. (mm) | Normalized Web Area ($A_{nw}$), min, in.$^2$/ft$^2$ (mm$^2$/m$^2$) |
|---|---|---|---|
| 3 (76.2) and 4 (102) | ¾ (19) | ¾ (19) | 6.5 (45, 140) |
| 6 (152) | 1 (25) | ¾ (19) | 6.5 (45, 140) |
| 8 (203) and greater | 1 ¼ (32) | ¾ (19) | 6.5 (45, 140) |

The above measurements should be an average of measurements on a minimum of 3 units when measured as described in ASTM C14.

TABLE 2

Strength Requirements

| Density Classification | Minimum Net Area Compressive Strength, lb/in$^2$ (MPa) | |
|---|---|---|
| Lightweight | Average of 3 Units 2000 (13.8) | Individual Units 1800 (12.4) |

Test Results

| | Control | | | Composition 1 | | | Composition 2 | | |
|---|---|---|---|---|---|---|---|---|---|
| | Unit Ca | Unit Cb | Unit Cc | Unit 1a | Unit 1b | Unit 1c | Unit 2a | Unit 2b | Unit 2c |
| Average width (W) in. | 7.7 | 7.68 | 7.68 | 7.67 | 7.65 | 7.66 | 7.67 | 7.66 | 7.67 |
| Average Face Shell Thickness (FST) in. | 1.32 | 1.33 | 1.33 | 1.32 | 1.33 | 1.33 | 1.33 | 1.33 | 1.34 |
| Average Web Thickness (WT) in. | 1.32 | 1.32 | 1.32 | 1.32 | 1.32 | 1.32 | 1.31 | 1.32 | 1.37 |
| Compressive Load lbs. | 316990 | 282780 | 227900 | 127740 | 129680 | 127960 | 175590 | 171090 | 230640 |

-continued

| | Control | | | Composition 1 | | | Composition 2 | | |
| --- | --- | --- | --- | --- | --- | --- | --- | --- | --- |
| | Unit Ca | Unit Cb | Unit Cc | Unit 1a | Unit 1b | Unit 1c | Unit 2a | Unit 2b | Unit 2c |
| Compressive Strength Gross Area (psi) | 2630 | 2350 | 1890 | 1060 | 1080 | 1070 | 1460 | 1430 | 1920 |
| Compressive Strength Net Area (psi) | 5100 | 4560 | 4450 | 2060 | 2090 | 2060 | 2830 | 2760 | 3720 |

Face shell thickness and web thickness contribute to structural integrity and load distribution. As indicated in the above results, the CMUs 10 formed by composition 1 and composition 2 have face shell thickness and web thickness that conform with ASTM C90. Moreover, as indicated above, the results of compressive strength net area also conform with ASTM C90.

Referring to FIG. 2, an exemplary method of utilizing the composition to manufacture a plurality of CMUs is presented herein. It is anticipated that several steps may be sequentially interchangeable and equivalent application of one or more permutations of such sequentially interchangeable steps does not alter the spirit of the invention in any meaningful way.

Next, a predetermined amount of cement, a predetermined amount of aggregate, a predetermined amount of sand, and a predetermined amount of microbeads are combined with a predetermined amount of water to form a mixture. In some implements, the predetermined amount of water is approximately 0.6 to 0.7 percent of the weight of the composition.

Then, the mixture is transferred to a hopper of an automated block machine and afterwards, molded.

Then the mixture is compacted and vibrated by the automated block machine to form a plurality of CMUs.

Then the plurality of CMUs are demolded.

Last, the CMUs are cured for at least a predetermined period of time, which is preferably 14 days, to reach a net area compressive strength complying ASTM C140.

While the embodiments of the invention have been disclosed, certain modifications may be made by those skilled in the art to modify the invention without departing from the spirit of the invention.

The invention claimed is:

1. A concrete masonry unit composition for automated block machines, the composition comprising:
   13 to 23 percent of cement with respect to total weight of the composition;
   20 to 30 percent of coarse aggregate with respect to total weight of the composition;
   60 to 66.75 percent of fine aggregate with respect to total weight of the composition; and
   0.25 to 0.5 percent of microbeads with respect to total weight of the composition.

2. The composition of claim 1, wherein each of the microbeads has a diameter of 0.1 millimeters to 3.2 millimeters.

3. The composition of claim 2, wherein each of the microbeads has a diameter of 0.2 millimeters.

4. The composition of claim 1, wherein the cement comprises Portland cement Type I, Type IA, Type II, Type IIA, Type III, Type IIIA, Type IV, Type V, modified cement, hydraulic cement, blast furnace slag cement or a combination thereof.

5. The composition of claim 1, wherein the fine aggregate comprises sand.

6. The composition of claim 1, further comprising one or more of water reducer agents, bonding agents, color agents and water proofing agents.

7. The composition of claim 1, wherein the coarse aggregate is normal weight aggregate or lightweight aggregate.

8. The composition of claim 1, wherein the fine aggregate is normal weight aggregate or lightweight aggregate.

9. A concrete masonry unit composition for automated block machines, the composition comprising:
   13 to 23 percent of cement with respect to total weight of the composition;
   20 to 30 percent of coarse aggregate with respect to total weight of the composition;
   60 to 66.75 percent of sand with respect to total weight of the composition; and
   0.25 to 0.5 of microbeads with respect to total weight of the composition.

10. The composition of claim 9, wherein each of the microbeads has a diameter of 0.1 millimeters to 3.2 millimeters.

11. The composition of claim 9, wherein the cement comprises Portland cement Type I, Type IA, Type II, Type IIA, Type III, Type IIIA, Type IV, Type V, modified cement, hydraulic cement, blast furnace slag cement or a combination thereof.

12. The composition of claim 9, further comprising one or more of water reducer agents, bonding agents, color agents and water proofing agents.

13. The composition of claim 9, wherein the coarse aggregate comprises normal weight aggregate or lightweight aggregate.

14. A concrete masonry unit composition for automated block machines, the composition comprising:
   13 to 23 percent of cement with respect to total weight of the composition;
   20 to 30 percent of coarse aggregate with respect to total weight of the composition;
   60 to 66.75 percent of fine aggregate with respect to total weight of the composition;
   0.25 to 0.5 percent of microbeads with respect to total weight of the composition; and
   wherein each of the microbeads has a diameter of 0.1 millimeters to 3.2 millimeters.

15. The composition of claim 14, wherein each of the microbeads has a diameter of 0.2 millimeters.

16. The composition of claim 14, wherein the cement comprises Portland cement Type I, Type IA, Type II, Type IIA, Type III, Type IIIA, Type IV, Type V, modified cement, hydraulic cement, blast furnace slag cement or a combination thereof.

17. The composition of claim 14, wherein the fine aggregate comprises sand.

18. The composition of claim 14, wherein the coarse aggregate comprises normal weight aggregate or lightweight aggregate.

19. The composition of claim 14, wherein the fine aggregate comprises normal weight aggregate or lightweight aggregate.

\* \* \* \* \*